US011828077B2

(12) United States Patent
Miller

(10) Patent No.: US 11,828,077 B2
(45) Date of Patent: Nov. 28, 2023

(54) INVERTED CABLE DRIVEN MAST

(71) Applicant: Kevin Miller, Norton, OH (US)

(72) Inventor: Kevin Miller, Norton, OH (US)

( * ) Notice: Subject to any disclaimer, the term of this patent is extended or adjusted under 35 U.S.C. 154(b) by 497 days.

(21) Appl. No.: 16/990,624

(22) Filed: Aug. 11, 2020

(65) Prior Publication Data

US 2021/0047161 A1 Feb. 18, 2021

Related U.S. Application Data

(60) Provisional application No. 62/885,590, filed on Aug. 12, 2019.

(51) Int. Cl.
| | | |
|---|---|---|
| *E04H 12/18* | (2006.01) | |
| *F21V 21/22* | (2006.01) | |
| *F16M 11/28* | (2006.01) | |
| *F16M 13/02* | (2006.01) | |
| *H01Q 1/12* | (2006.01) | |

(52) U.S. Cl.
CPC .......... *E04H 12/182* (2013.01); *E04H 12/18* (2013.01); *F16M 11/28* (2013.01); *F16M 13/027* (2013.01); *F21V 21/22* (2013.01); *H01Q 1/1235* (2013.01); *B66F 2700/09* (2013.01)

(58) Field of Classification Search
CPC ... B66F 2700/09; E04H 12/18; E04H 12/182; F16M 11/28; F16M 13/027; F21V 21/22; H01Q 1/1235
See application file for complete search history.

(56) References Cited

U.S. PATENT DOCUMENTS

| | | | | |
|---|---|---|---|---|
| 5,615,855 | A | * 4/1997 | Marue | ................ B60P 3/18 |
| | | | | 52/118 |
| RE37,559 | E | * 2/2002 | Marue | ............... F16M 11/28 |
| | | | | 52/118 |
| 2012/0110927 | A1 | 5/2012 | Liestenfeltz et al. | |
| 2014/0318324 | A1 * | 10/2014 | Buchner | ............ B23Q 1/703 |
| | | | | 408/67 |
| 2018/0312377 | A1 | 11/2018 | Jakober et al. | |
| 2018/0314053 | A1 * | 11/2018 | Jakober | ............ F16M 11/046 |

FOREIGN PATENT DOCUMENTS

| | | |
|---|---|---|
| CN | 101311562 A | 11/2008 |
| CN | 101325852 A | 12/2008 |
| CN | 201739735 U | 2/2011 |
| CN | 104181764 A | 12/2014 |

(Continued)

OTHER PUBLICATIONS

International Preliminary Report on Patentability of International Application No. PCT/US2020/045766 dated Sep. 16, 2021 (21 pages).

*Primary Examiner* — Jessie T Fonseca
(74) *Attorney, Agent, or Firm* — Lippes Mathias LLP

(57) ABSTRACT

An inverted telescoping mast configured to be mounted to a ceiling or other structure within a building for supporting a payload at a range of heights within the building. The mast can include cable management for routing of cables external the mast for supplying/exchanging power, control signals, data etc. to the payload. An internal spring retains the mast in the retracted position. A tension control system restricts extension and/or retraction of the mast when actuating cable tension is above or below respective tension thresholds.

15 Claims, 11 Drawing Sheets

(56) References Cited

FOREIGN PATENT DOCUMENTS

| | | | |
|---|---:|---|---|
| CN | 106930644 | A | 7/2017 |
| CN | 108799279 | A | 11/2018 |
| CN | 208569280 | U | 3/2019 |
| CN | 208916495 | U | 5/2019 |
| DE | 102015006183 | A1 | 11/2016 |
| DE | 10 2017 207 246 | A1 | 10/2018 |
| DE | 102017207246 | A1 | 10/2018 |
| DE | 102017207251 | A1 | 10/2018 |
| EP | 300316 | A * | 1/1989 ............ F16M 11/18 |
| GB | 2107667 | A | 5/1983 |
| GB | 9906035 | D0 | 5/1999 |
| GB | 2 348 272 | A | 9/2000 |
| GB | 1007667.7 | | 5/2010 |
| IN | 101442921 | A | 5/2009 |
| JP | 2001163588 | A | 6/2001 |
| JP | 2002-163588 | | 6/2002 |
| SU | 1209952 | A1 * | 2/1986 |
| WO | 2006056563 | A1 | 6/2006 |

\* cited by examiner

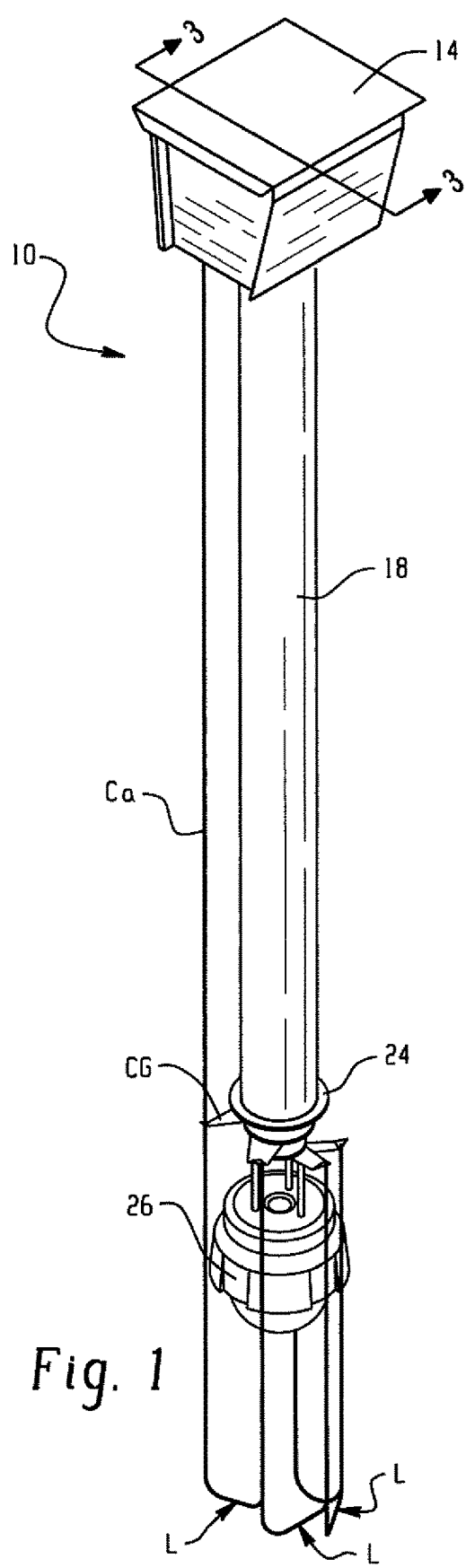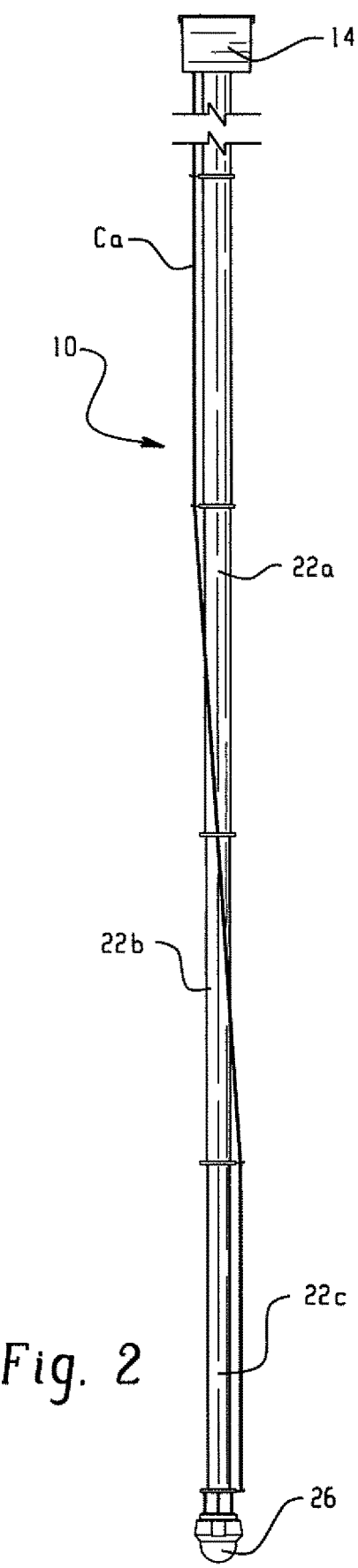

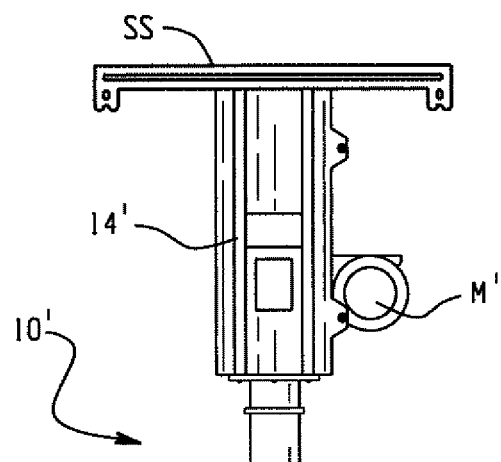
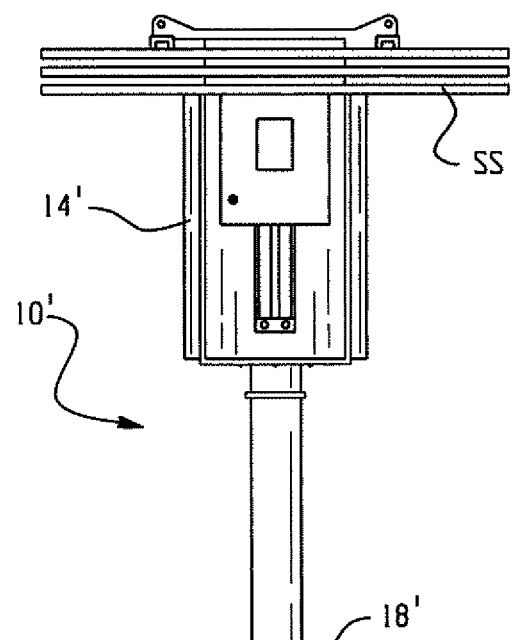
Fig. 4
Fig. 5

INVERTED CABLE DRIVEN MAST

CROSS-REFERENCE TO RELATED APPLICATION

This application claims the benefit of U.S. Provisional Application No. 62/885,590, filed Aug. 12, 2019, incorporated herein by reference in its entirety.

BACKGROUND

The present exemplary embodiment relates to telescoping masts. It finds particular application in conjunction with telescoping masts for supporting equipment, such as a camera, and will be described with particular reference thereto. However, it is to be appreciated that the present exemplary embodiment is also amenable to other like applications.

Telescoping masts are often used to support equipment, including cameras, lights, sensors, etc. on outdoor facilities, vehicles, etc. The telescoping masts allow an operator to raise and lower a payload as desired between a first height and a second height. Telescoping masts are utilized to obtain a higher point-of-view for mast mounted cameras and/or other sensors, and/or a clear line of site for signal transmission between a mast mounted antenna and a receiver.

BRIEF DESCRIPTION

The present disclosure sets forth an inverted telescoping mast configured to be mounted to a ceiling or other structure within a building for supporting a payload at a range of heights within the building.

In accordance with one aspect of the present exemplary embodiment, a mast mountable to a ceiling structure of an associated building comprises a base, a base tube supported by the base, at least one telescoping tube section supported to provide axial movement within the base tube between a retracted position and an extended position, and a motor operatively coupled to the at least one telescoping tube section and configured to extend and retract the at least one telescoping tube section within the base tube. A payload supported by the mast can be positioned at a plurality of heights within the associated building.

The mast can further include an actuating cable extending between the motor and the at least one telescoping tube section configured to extend or retract the at least one telescoping tube section depending on a direction of rotation of the motor, and a spring assembly supported by the at least one telescoping tube section. The spring assembly can be tensioned by the actuating cable when the actuation cable is in tension. In normal operation, the spring assembly is generally only loaded by the weight of the payload. The mast is configured to stop short by about, for example, an inch while retracting to prevent overtravel. The spring assembly will, however, be stretched when the over tension limit switch stops travel. As such, the spring assembly is configured to prevent or reduce an abrupt stop during retraction. The mast can include at least one power or control cable and at least one cable guide configured to guide the at least one power or control cable around an exterior surface of the mast. The at least one power or control cable can spiral around an exterior surface of the mast when the at least one tube section is in an extended position. The base tube can include a guy plate configured to connect one or more support cables. The guy plate can be supported on the base tube at an opposite end from the connection of the base tube to the base. The motor can be supported within the base, or on an exterior of the base.

The mast can include an actuating cable extending between the motor and the at least one telescoping tube section configured to extend or retract the at least one telescoping tube section depending on a direction of rotation of the motor, and a cable tension control system configured to restrict operation of the motor in response to a level of tension in the actuating cable.

In accordance with another aspect of the present exemplary embodiment, a cable tension control system can include a cable carriage supported to provide reciprocating movement relative to the base and a first sensor configured to sense an over-tension condition. The actuating cable can be configured to move the cable carriage in a first direction in response to a tension in the actuating cable exceeding an upper threshold tension level, the cable carriage triggering the first sensor to restrict operation of the motor. A second sensor is configured to sense an under-tension condition can be provided along with a biasing element configured to bias the cable carriage in a second direction opposite the first direction. The biasing element can be configured to move the cable carriage in the second direction in response to tension in the cable being below a lower threshold tension level, the cable carriage triggering the second sensor to restrict operation of the motor. The first and second sensors can include limit switches.

In accordance with another aspect of the present exemplary embodiment, a mast mountable to a ceiling structure of an associated building is provided. The mast can include a base, a base tube supported by the base, a plurality of telescoping tube sections supported to provide axial movement within the base tube between a retracted position and an extended position, a motor operatively coupled to an innermost tube section of the plurality of telescoping tube sections by an actuating cable configured to extend and retract the plurality of telescoping tube sections within the base tube depending on a direction of rotation of the motor, a spring assembly supported by the innermost tube section, wherein said spring assembly can be tensioned by the actuating cable when the actuating cable is under tension, at least one power or control cable and at least one cable guide associated with each of the plurality of telescoping tube sections configured to guide the at least one power or control cable around an exterior surface of the mast, the cable guides being radially offset such that the at least one power or control cable spirals around an exterior surface of the mast when the plurality of telescoping tube sections are in an extended position, and a cable tension control system. The cable tension control system can have a cable carriage supported and providing reciprocating movement relative to the base, and a first sensor configured to sense an over-tension condition of the actuating cable, wherein the actuating cable is configured to move the cable carriage in a first direction in response to a tension in the actuating cable exceeding an upper threshold tension level, the cable carriage triggering the first sensor to restrict operation of a motor of the associated telescoping mast and a second sensor configured to sense an under-tension condition of the actuating cable, and a biasing element configured to bias the cable carriage in a second direction opposite the first direction, wherein the biasing element is configured to move the cable carriage in the second direction in response to tension in the actuating cable being below a lower threshold tension level, the cable carriage triggering the second sensor to restrict operation of a motor of the telescoping mast.

BRIEF DESCRIPTION OF THE DRAWINGS

FIG. 1 is perspective view of an exemplary mast in a retracted position in accordance with the present disclosure;

FIG. 2 is a side view of the mast of FIG. 1 in an extended position;

FIG. 4 is a side view of another exemplary mast in a retracted position in accordance with the present disclosure;

FIG. 5 is a front view of the mast of FIG. 4;

DETAILED DESCRIPTION

Figure 3:
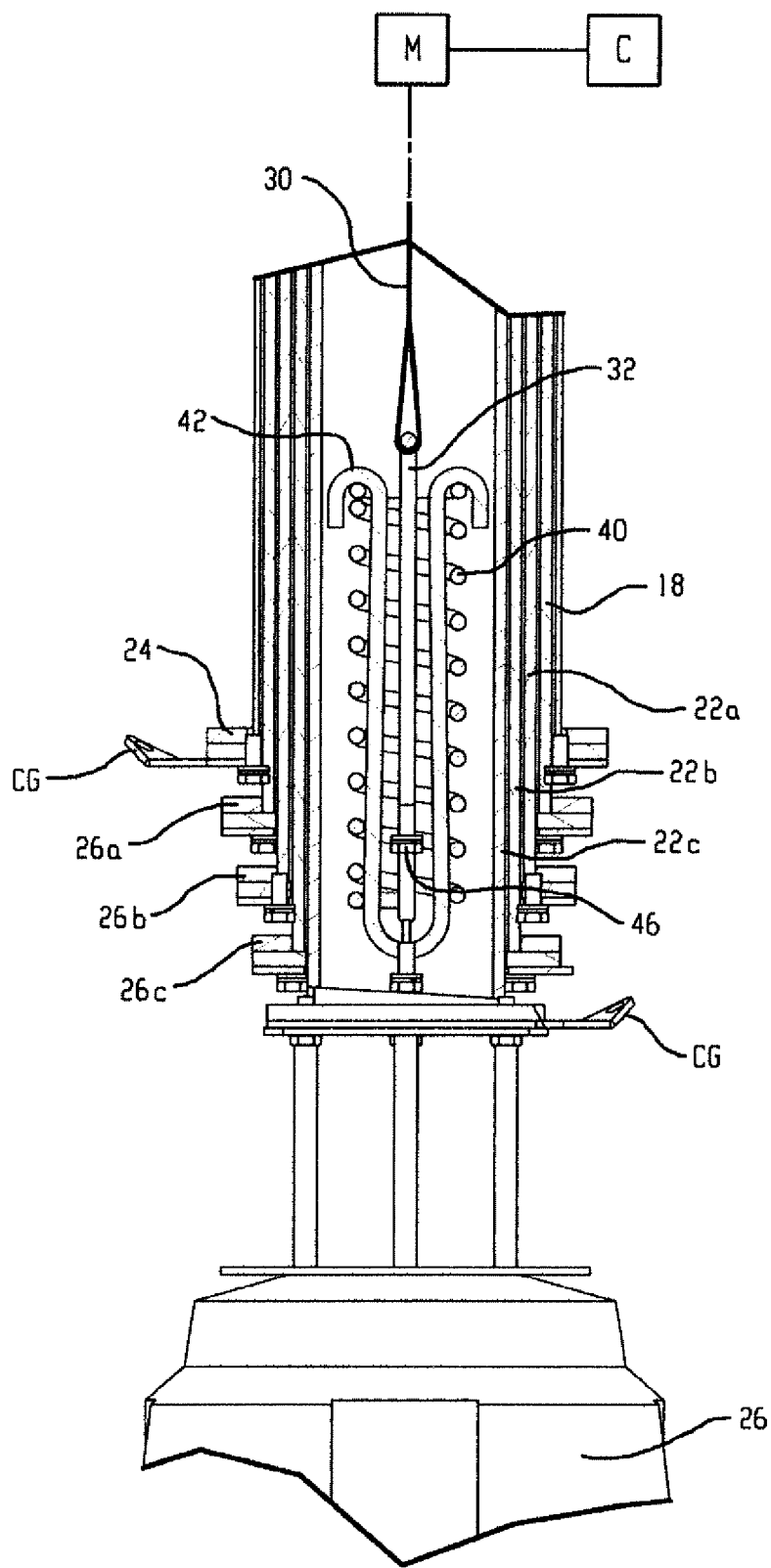
FIG. 3 is a cross-sectional view of a lower portion of the mast taken through the longitudinal axis of the mast along line 3-3 in FIG. 1.
Figure 6:
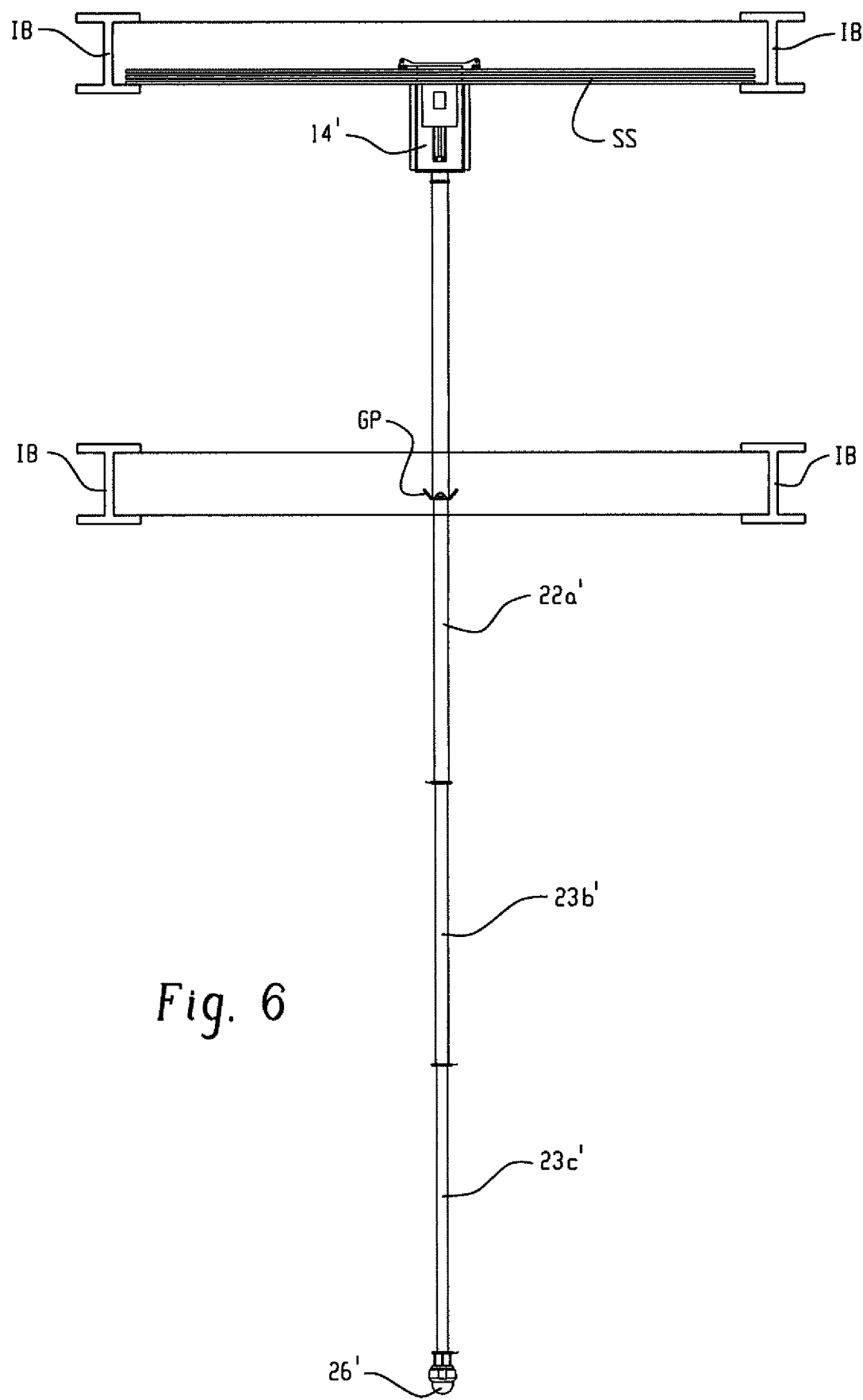
FIG. 6 is a front view of the mast of FIGS. 4 and 5 in an extended position.
Figure 7:
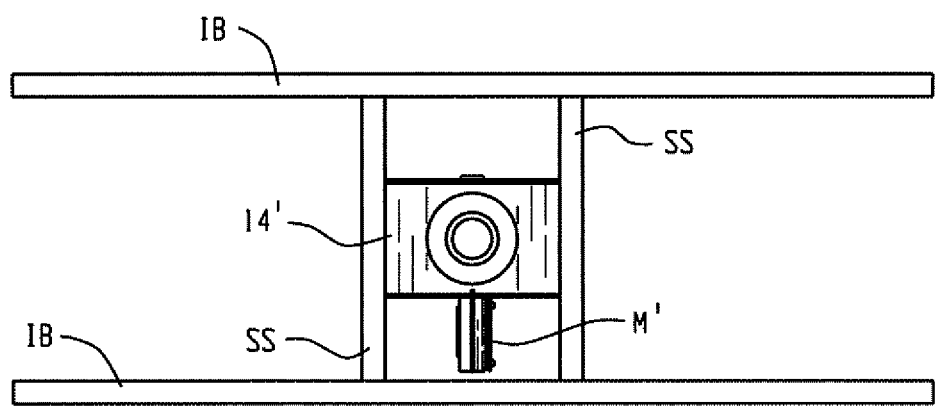
FIG. 7 is a top view of the mast of FIG. 4.
Figure 8:
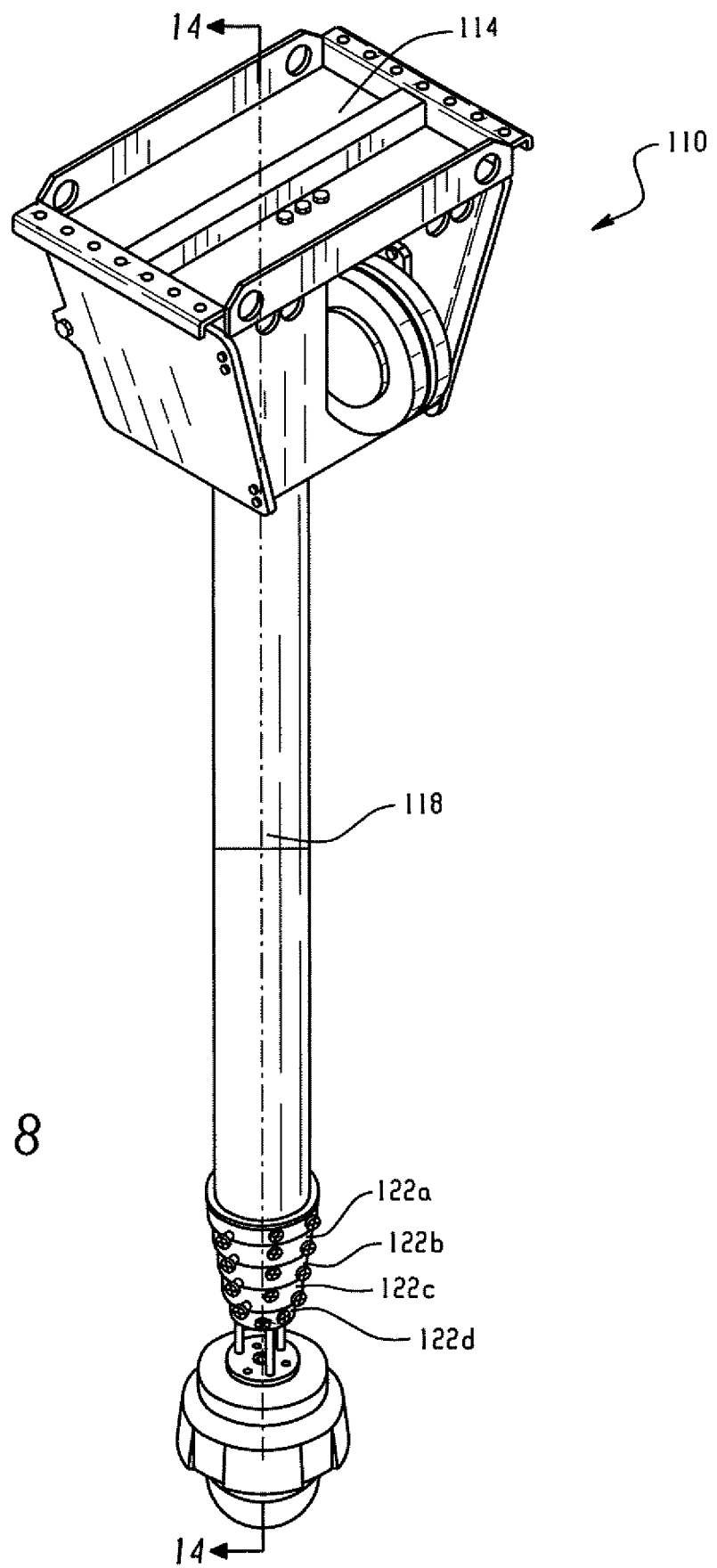
FIG. 8 is a first perspective view of another exemplary mast in accordance with the present disclosure.
Figure 9:
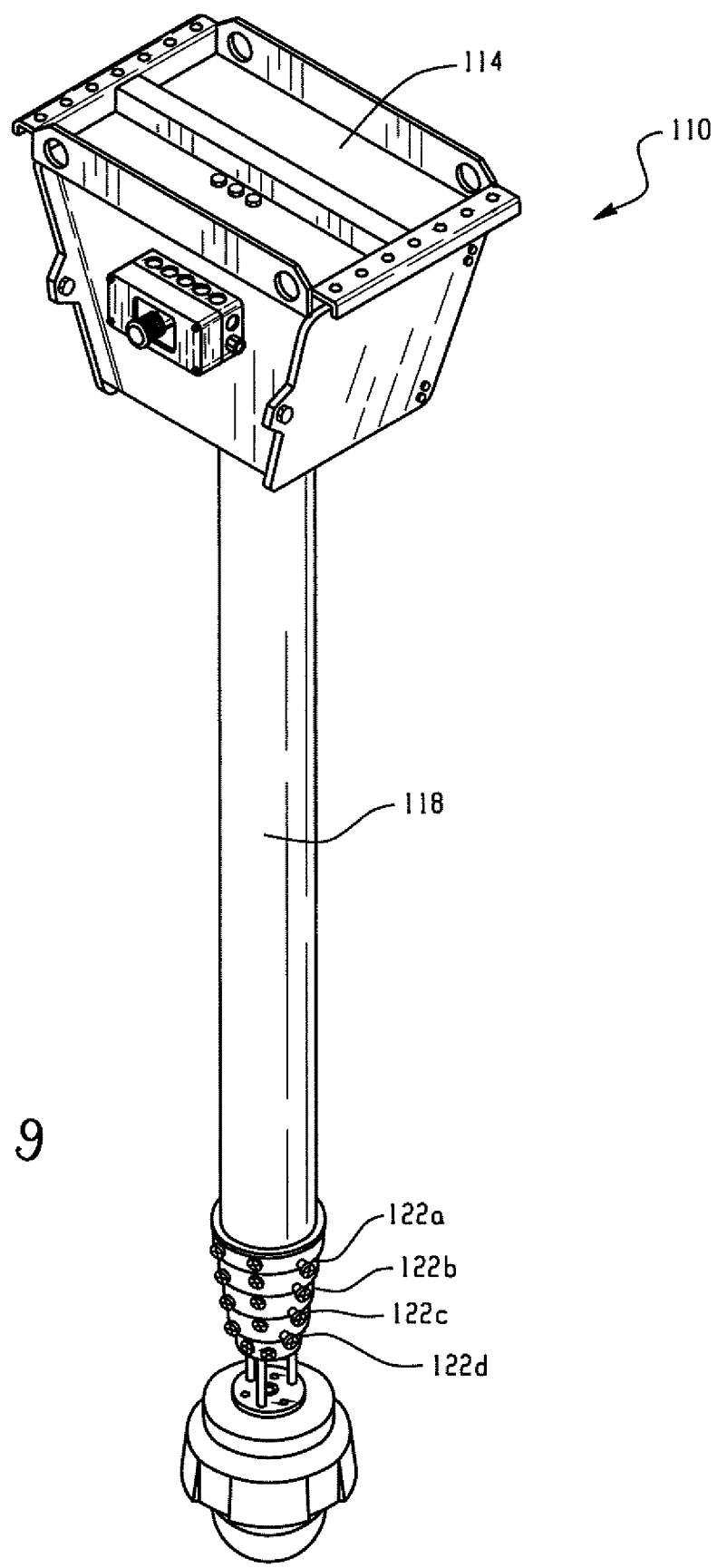
FIG. 9 is a second perspective view of the mast of FIG. 8.
Figure 10:
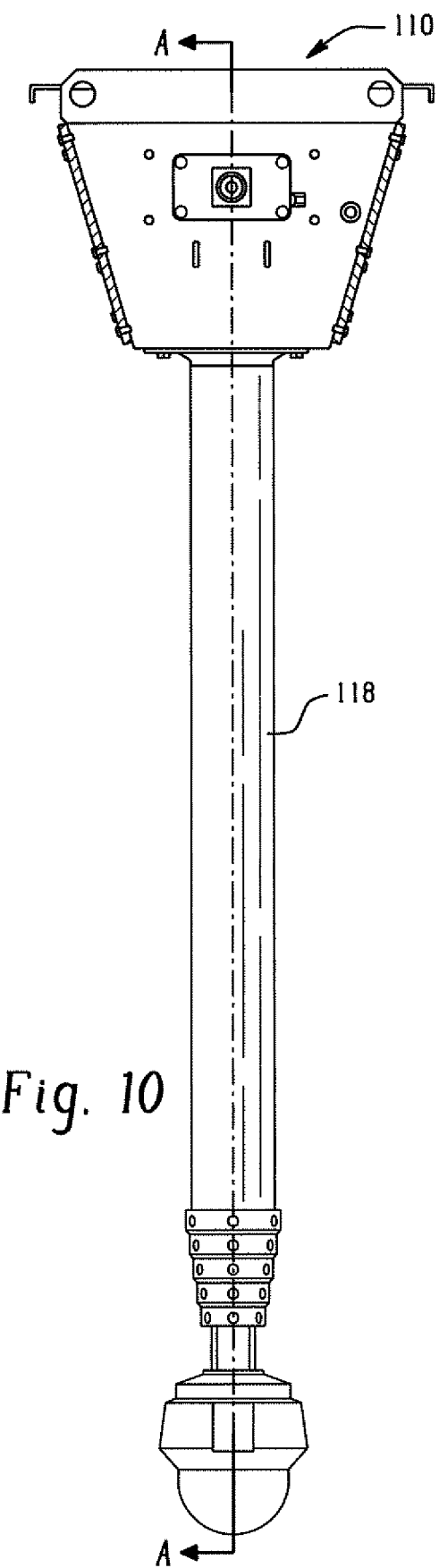
FIG. 10 is a side elevational view of the mast of FIG. 8.

Turning to the FIGURES, and initially to FIGS. 1 and 2, an exemplary inverted cable driven mast in accordance with the present disclosure is illustrated and identified generally by reference numeral 10. In FIG. 1, the mast 10 is illustrated in a retracted state and in FIG. 2, the mast 10 is illustrated in an extended state. The mast 10 includes a base 14 mountable to a surface, such as a ceiling joist or other building structure. The base 14 supports a base tube 18 and a plurality of telescoping tube sections 22a-22c. The telescoping tube sections are configured for sliding axial movement within each other and/or the base tube 18 between the retracted position shown in FIG. 1 and the extended position shown in FIG. 2.

With additional reference to FIG. 3, it will be appreciated that the base tube includes a radially outwardly extending collar 24 and a cable guide CG for routing of a cable Ca to a payload supported by the mast 10, which in the illustrated embodiment is a camera 26. Cable Ca can provide power and/or data connection to the payload (e.g., camera 26). Each of the telescoping tube sections 22a-22c also include a collar 26a-26c and a cable guide CG. As best seen in FIG. 2, the cable Ca is routed through the cable guides CG which are radially offset such that the cable Ca spirals around the base tube 18 and telescoping tube sections 22a-22c when the mast is in the extended position. In the retracted position of FIG. 1, the cable Ca is configured to form multiple loops L to neatly stow the cable when the mast 10 is retracted.

The telescoping tube sections 22a-22c are extended and retracted via an actuating cable 30 which is connected between a motor M and a spring assembly 32 secured to innermost telescoping tube section 22c. It will be appreciated that the motor M is coupled to a controller C for controlling extension and retraction of the mast 10, In this regard, the controller C can include one or more microprocessors and/or user interfaces for actuating the mast 10. In some embodiments, the controller C can take the form of a simple switch for operating the motor M in a forward or reverse direction as desired to extend or retract the mast 10. Suitable limit switches or other sensors can be employed for deactivating the motor M when the telescoping tube sections 22a-22c have reached their fully extended positions and/or fully retracted positions.

The spring assembly 32 is supported within telescoping tube section 22c in a generally coaxial relation with telescoping tube 22c. The spring assembly 32 includes a compression spring and first and second spring support 38 and 42. Each spring support 38 and 42 extends in opposite directions through a central opening of the compression spring 40. A first end of each spring support includes a pair of hooks H for engaging a respective end of the compression spring 40 and a loop L, or u-shape end, for connection to either the payload or the actuating cable. As such, when tension is applied to the spring assembly 32 by pulling on loops L, the compression spring is compressed. It will be appreciated that only the hooks H and loop L of spring support 42 are visible in the particular cross-sectional view of FIG. 3. The spring assembly 32 generally operates to hold the nested telescoping tube sections 22a-22c together in a tight fashion while ensuring smooth operation of the mast 10 and protecting against overtravel of the retraction mechanism.

It should now be appreciated that the mast 10 is suitable for mounting to an interior structure or overhead support surface such as a ceiling (or other ceiling structure, etc.) via base 14. Any suitable payload can be supported on the working end of the mast 10. When the payload equipment is to be utilized, the mast 10 can be extended to any desired position between the retracted position and the fully extended position shown in FIGS. 1 and 2. When the payload equipment is no longer in use, the mast 10 can be retracted.

FIGS. 4-7 illustrate another exemplary inverted cable driven mast 10' in accordance with the present disclosure. The mast 10' is similar in many respects to the mast 10' shown and described in connection with FIGS. 1-3 and it will be appreciated that components of the mast 10' that are similar to the mast 10 are shown with similar "primed" reference numerals.

The mast 10' is illustrated in a retracted state and in FIGS. 4 and 5, the mast 10' is illustrated in a retracted state. The mast 10' includes a base 14' mountable to a surface, such as a ceiling joist or other building structure. In this embodiment, the base 14' is mounted to a pair of supporting struts SS that in turn are mounted to respective I-beams IB of a ceiling structure of a building. The base 14' supports a base tube 18' and a plurality of telescoping tube sections 22a'-22c'. The telescoping tube sections 22a'-22b' are configured for sliding axial movement within each other and/or the base tube 18' between the retracted position shown in FIGS. 4 and 5 and the extended position shown in FIG. 6.

It will be appreciated that the base tube 18' includes a guy plate GP for attaching support cables (not shown) to other ceiling/roof structure (e.g., I-beams IB of a roof truss) for providing lateral support to the mast 10'. In this embodiment, cabling for power and/or data communication is supported within an interior of the mast 10'. Like mast 10, mast 10' is shown with a camera 26' supported thereon.

The telescoping tube sections 22a'-22c' are extended and retracted via an actuating cable (not visible in this embodiment) which is connected between a motor M' and the innermost telescoping tube section 22c'. It will be appreciated that the motor M' and actuating cable function in a similar manner to the motor M and actuating cable 30 of the embodiment of FIGS. 1-3 except that the motor M' is located external to the base 14'. The motor M' is coupled to a controller for controlling extension and retraction of the mast 10. In this regard, the controller can include one or more microprocessors and/or user interfaces for actuating the mast 10'. In some embodiments, the controller can take the form of a simple switch for operating the motor M' in a forward or reverse direction as desired to extend or retract the mast 10'. Suitable limit switches or other sensors can be employed for deactivating the motor M when the telescoping tube sections 22a'-22c' have reached their fully extended positions and/or fully retracted positions.

In one example embodiment, a mast in accordance with the present disclosure can have a retracted length of about 14 feet and an extending length of about 42 feet. In such configuration, the mast would have a working distance of approximately 28 feet. When installed in a roof truss of building having a 40-foot clear height, the mast would support a payload at any desired height between about 39 feet and about 10 feet above the floor of the building.

Turning to FIGS. 8-14, another exemplary embodiment of an inverted telescoping mast in accordance with the present invention is illustrated and identified generally by reference numeral 110. In FIGS. 8-11 the mast 110 is illustrated in a retracted state and in FIG. 13, the mast 110 is illustrated in both a retracted state and an extended state to illustrate mast travel. The mast 110 includes a base 114 mountable to a surface, such as a ceiling joist or other building structure. The base 114 supports a base tube 118 and a plurality of telescoping tube sections 122a-122d. The telescoping tube sections are configured for sliding axial movement within each other and/or the base tube 118 between the retracted position shown in FIG. 8 and the extended position shown on the right in FIG. 13.

Figure 11:
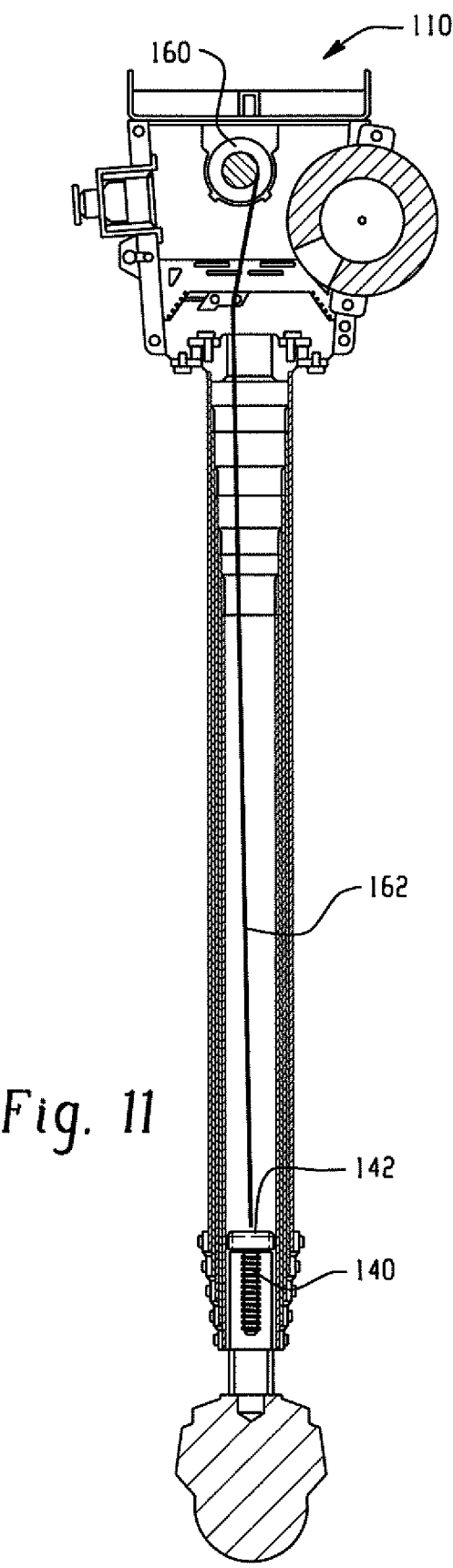
FIG. 11 is a cross-sectional view taken along the line A-A of FIG. 10.
Figure 12:
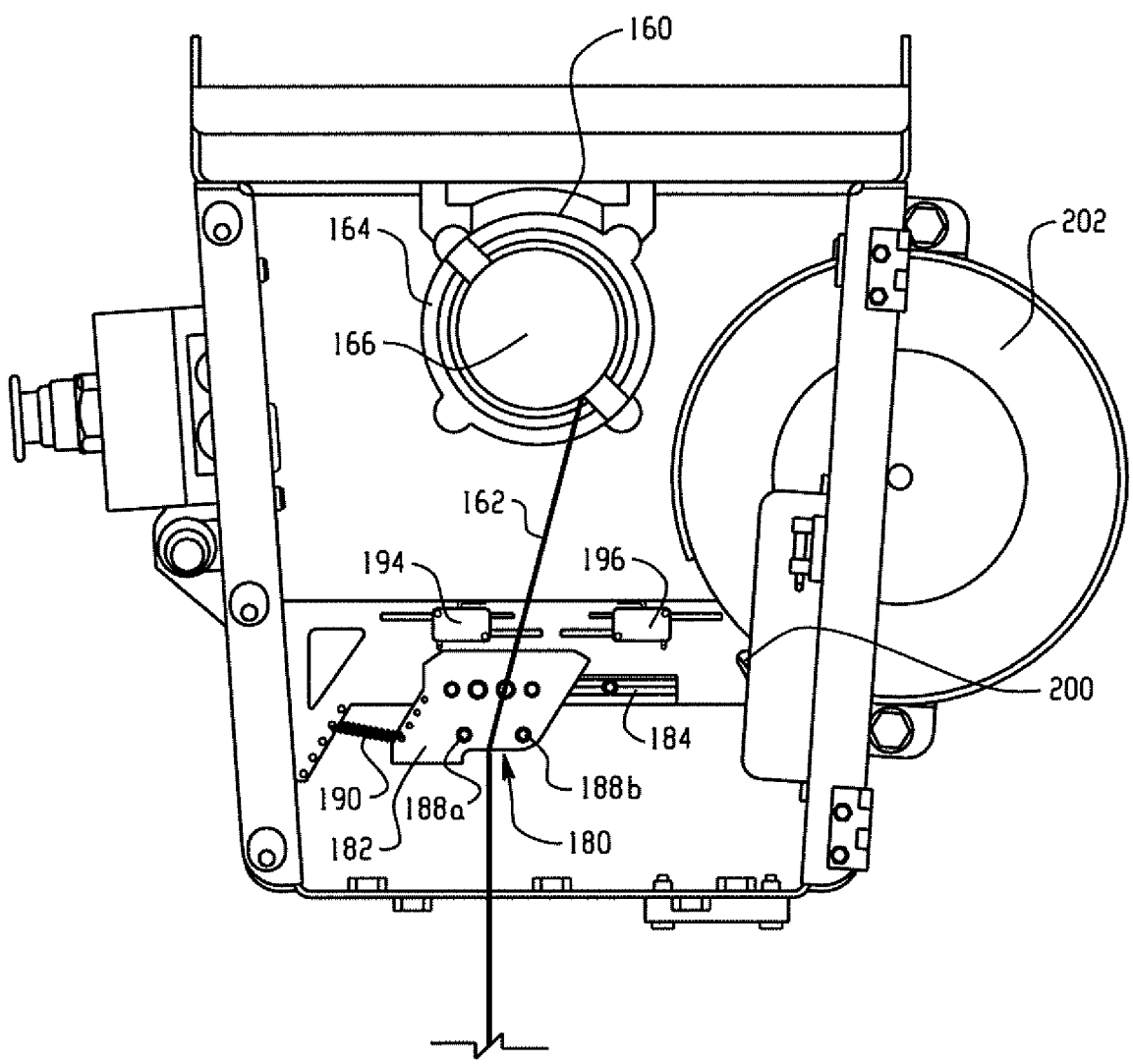
FIG. 12 is an enlarged view of a base of the mast of FIG. 8.
Figure 13:
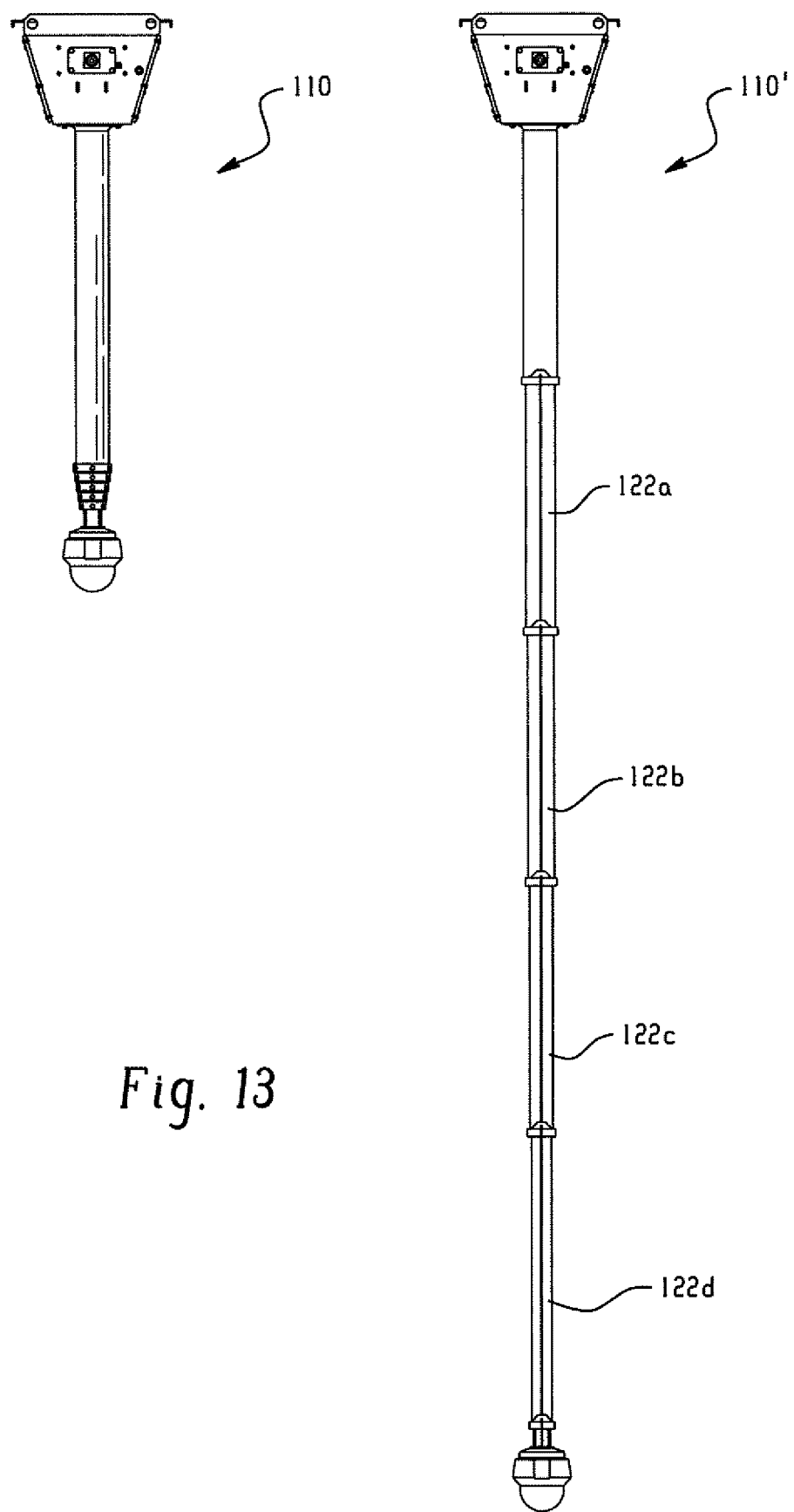
FIG. 13 is a side-by-side elevational view comparison of the mast of FIG. 8 in respective retracted and extended states.

With reference to FIGS. 11 and 12, the base 114 also houses a hoist 160 for extending and retracting a cable 162 to effect extension/retraction of the telescoping tube sections 122a-122d. In one embodiment, the hoist 160 includes a DC motor 164 operatively coupled to a spool 166 for winding and unwinding the cable 162. It will be appreciated that the cable 162 is attached to telescoping tube section 122d and, accordingly, deployment of the cable 162 by the hoist 160 extends the mast 110 while retraction of the cable 162 retracts the mast 110.

As such, the telescoping tube sections 122a-122d are extended and retracted via cable 162 by operation of the hoist 160. As described in connection with mast 10 of the previous embodiment, it will be appreciated that the hoist 160 is coupled to a controller (not shown in this embodiment) for controlling extension and retraction of the mast 110. In this regard, the controller can include one or more microprocessors and/or user interfaces for actuating the mast 110. In some embodiments, the controller can take the form of a simple switch for operating the hoist 160 in a forward or reverse direction as desired to extend or retract the mast 110. Suitable limit switches or other sensors can be employed for deactivating the hoist 160 when the telescoping tube sections 122a-122d have reached their fully extended positions and/or fully retracted positions.

Figure 14:
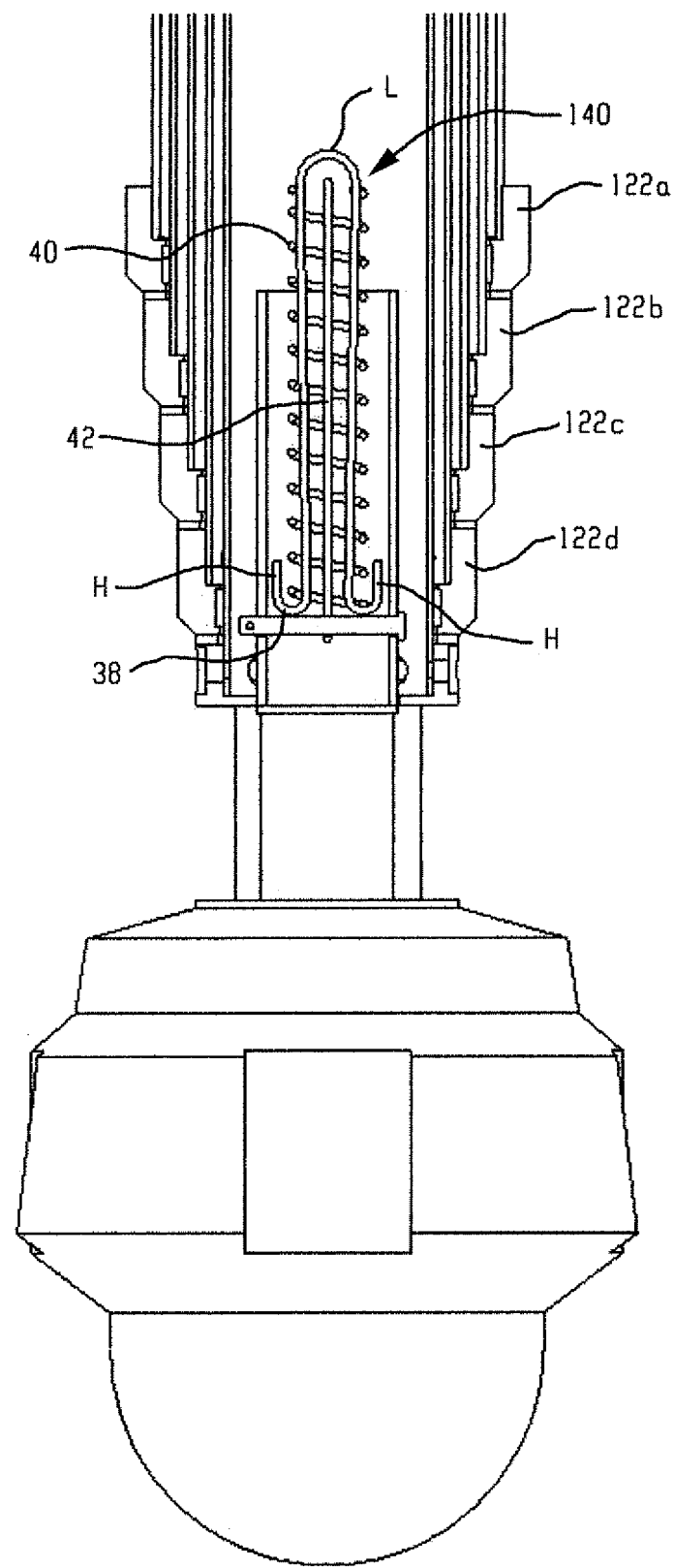
FIG. 14 is a cross-sectional view of a lower portion of the mast taken through the longitudinal axis of the mast along line 14-14 in FIG. 8.

Similar to mast 10, and as best shown in FIG. 14, a spring assembly 140 is supported in telescoping tube section 122d and operatively coupled to the cable 162. The spring assembly 140 is supported within telescoping tube section 122d in a generally coaxial relation with telescoping tube 122d. The spring assembly 140 is identical to spring assembly 32 and includes a compression spring 40 and first and second spring supports 38 and 42. Each spring support 38 and 42 extends in opposite directions through a central opening of the compression spring 40. A first end of each spring support includes a pair of hooks H for engaging a respective end of the compression spring 40 and a loop L, or u-shape end, for connection to either the payload or the actuating cable. As such, when tension is applied to the spring assembly 32 by pulling on loops L, the compression spring is compressed. It will be appreciated that only the hooks H and loop L of spring support 42 are visible in the particular cross-sectional view of FIG. 14. The spring assembly 32 generally operates to hold the nested telescoping tube sections 122a-122d together in a tight fashion while ensuring smooth operation of the mast 110 and protecting against overtravel of the retraction mechanism.

Mast 110 also includes a cable tension control system, identified generally by reference numeral 180, configured to restrict retraction or extension of the cable 162 if insufficient and/or excessive cable tension is present in cable 162. Insufficient cable tension can occur, for example, if one or more of the telescoping tube sections 122a-122d fails to extend while the hoist 160 is activated to deploy the cable 162. This can occur, for example, if an object blocks extension of one or more of the tube sections 122a-122d. Excessive cable tension can occur, for example, if the hoist 160 is activated to retract the cable 162 but one or more of the tube sections 122a-122d is blocked from retracting.

With reference to FIG. 12, the cable tension control system 180 includes a cable carriage 182 supported for sliding reciprocating movement within a slot 184 of the housing. The cable carriage 182 includes cable guides 188a and 188b between which the cable 162 is routed. A tension spring 190 biases the cable carriage 182 towards the left in FIG. 12. A low-tension limit switch 194 and a high-tension limit switch 196 are configured to be activated when respective low tension or high tension conditions are met, as described below. A data and/or power cable 200 is supported on a retractable reel 202 for supplying power and/or data connection to the payload. The reel 202 can be spring-loaded and configured to automatically pay out or retract the data/power cable 200 as the mast 110 is extended and retracted.

Under normal operating conditions, the cable 162 is under a base level tension that maintains the cable carriage 182 in a neutral position against the bias of the tension spring 190 such that neither limit switch 194 or 196 is activated. This base level of tension defines a working range of tension under which the actuating cable typically operates during an extension and retraction cycle. Should tension increase on the cable 162, the cable begins to act on the cable guide 188b to shift the cable carriage 182 rightward in FIG. 12. Once the cable 162 is under sufficient tension (e.g., upper tension threshold), the cable 162 and/or high-tension limit switch 196 is activated thereby shutting off the hoist 160 until such time as the tension on the cable is decreased. Similarly, should the cable tension decrease a sufficient amount (e.g., below a lower tension threshold), the tension spring 190 urges the cable carriage 182 left in FIG. 12 and the low tension limit switch 194 is activated thereby shutting off the hoist 160 until the low tension condition is removed. The tension spring 190 can be tuned to adjust the high/low tension level thresholds for triggering the limit switches.

It should be appreciated that other tension control systems can be employed such as load cells, and/or monitoring hoist motor current draw, for example.

It should now be appreciated that the mast 110 is suitable for mounting to an interior structure or overhead support surface such as a ceiling (or other ceiling structure, etc.) via base 114. Any suitable payload can be supported on the working end of the mast 110. When the payload equipment is to be utilized, the mast 110 can be extended to any desired position between the retracted position and the fully extended position shown in FIG. 13. When the payload equipment is no longer in use, the mast 110 can be retracted.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A mast mountable to a ceiling structure of an associated building comprising:
a base;
a base tube supported by the base;
at least one telescoping tube section supported to provide axial movement within the base tube between a retracted position and an extended position;
a motor operatively coupled to the at least one telescoping tube section and configured to provide extending and retracting of the at least one telescoping tube section within the base tube;
an actuating cable extending between the motor and the at least one telescoping tube section configured to extend or retract the at least one telescoping tube section depending on a direction of rotation of the motor; and
a coil spring supported in the at least one telescoping tube section and coupled to the actuating cable, wherein said spring is compressed by the actuating cable when the actuating cable is in tension;
further comprising at least one power or control cable and at least one cable guide configured to guide the at least one power or control cable around an exterior surface of the mast;
whereby a payload supported by the mast can be positioned at a plurality of heights within the associated building.

2. The mast of claim 1, wherein the at least one power or control cable spirals around an exterior surface of the mast when the at least one tube section is in an extended position.

3. The mast of claim 1, wherein the base tube includes a guy plate configured to connect one or more support cables.

4. The mast of claim 3, wherein the guy plate is supported on the base tube at an opposite end from the connection of the base tube to the base.

5. The mast of claim 1, wherein the motor is supported within the base.

6. The mast of claim 1, wherein the motor is supported on an exterior of the base.

7. The mast of claim 1, further comprising first and second spring supports, each spring support extending in opposite directions through a central opening of the coil spring.

8. The mast of claim 7, wherein a first end of each spring support includes a pair of hooks for engaging a respective end of the coil spring and a loop, the loop of the first spring support connected to the actuating cable and the loop of the second spring support connection to the payload, whereby when tension is applied to the actuating cable by the payload, the compression spring is compressed.

9. A mast mountable to a ceiling structure of an associated building comprising:
a base;
a base tube supported by the base;
at least one telescoping tube section supported to provide axial movement within the base tube between a retracted position and an extended position;
a motor operatively coupled to the at least one telescoping tube section and configured to provide extending and retracting of the at least one telescoping tube section within the base tube;
an actuating cable extending between the motor and the at least one telescoping tube section configured to extend or retract the at least one telescoping tube section depending on a direction of rotation of the motor; and
a coil spring supported in the at least one telescoping tube section and coupled to the actuating cable, wherein said spring is compressed by the actuating cable when the actuating cable is in tension;
whereby a payload supported by the mast can be positioned at a plurality of heights within the associated building,
wherein the mast further comprises a cable tension control system configured to restrict operation of the motor in response to a level of tension in the actuating cable;
wherein the cable tension control system includes a cable carriage supported to provide reciprocating movement relative to the base and a first sensor configured to sense an over-tension condition; wherein the actuating cable is configured to move the cable carriage in a first direction in response to a tension in the actuating cable exceeding an upper threshold tension level, the cable carriage triggering the first sensor to restrict operation of the motor.

10. The mast of claim 9, further comprising a second sensor configured to sense an under-tension condition, and a biasing element configured to bias the cable carriage in a second direction opposite the first direction, wherein the biasing element is configured to move the cable carriage in the second direction in response to tension in the cable being below a lower threshold tension level, the cable carriage triggering the second sensor to restrict operation of the motor.

11. The mast of claim 10, wherein the first and second sensors include limit switches.

12. A mast mountable to a ceiling structure of an associated building comprising:
a base;
a base tube supported by the base;
a plurality of telescoping tube sections supported to provided axial movement within the base tube between a retracted position and an extended position;
a motor operatively coupled to an innermost tube section of the plurality of telescoping tube sections by an actuating cable and configured to extend and retract the plurality of telescoping tube sections within the base tube depending on a direction of rotation of the motor;
a compression spring supported in the innermost tube section, wherein said compression spring is loaded compressed by the actuating cable when the actuating cable is under tension;

at least one power or control cable and at least one cable guide associated with each of the plurality of telescoping tube sections configured to guide the at least one power or control cable around an exterior surface of the mast, the cable guides being radially offset such that the at least one power or control cable spirals around an exterior surface of the mast when the plurality of telescoping tube sections are in an extended position; and a cable tension control system having:
- a cable carriage supported to provide reciprocating movement relative to the base, and a first sensor configured to sense an over-tension condition of the actuating cable, wherein the actuating cable is configured to move the cable carriage in a first direction in response to a tension in the actuating cable exceeding an upper threshold tension level, the cable carriage triggering the first sensor to restrict operation of a motor of the associated telescoping mast; and
- a second sensor configured to sense an under-tension condition of the actuating cable, and a biasing element configured to bias the cable carriage in a second direction opposite the first direction, wherein the biasing element is configured to move the cable carriage in the second direction in response to tension in the actuating cable being below a lower threshold tension level, the cable carriage triggering the second sensor to restrict operation of a motor of the telescoping mast.

13. The mast of claim 12, wherein the first and second sensors include limit switches.

14. The mast of claim 12, wherein the base tube includes a guy plate configured to connect one or more support cables.

15. The mast of claim 12, wherein the guy plate is supported on the base tube at an opposite end from the connection of the base tube to the base.

\* \* \* \* \*